United States Patent [19]
Thelen

[11] B 3,914,023
[45] Oct. 21, 1975

[54] WIDE-BAND MULTILAYER INTERFERENCE FILTER

[75] Inventor: Alfred Thelen, Furstentum, Liechtenstein

[73] Assignee: Balzers Patent-und Beteiligungs-AG., Liechtenstein

[22] Filed: Dec. 5, 1973

[21] Appl. No.: 421,797

[44] Published under the Trial Voluntary Protest Program on January 28, 1975 as document no. B 421,797.

[30] Foreign Application Priority Data
Dec. 8, 1972 Switzerland............. 17946/72

[52] U.S. Cl. .............. 350/164; 117/33.3; 350/1
[51] Int. Cl.² ........................... G02B 5/28
[58] Field of Search ........ 350/1, 164, 166; 117/33.3

[56] References Cited
UNITED STATES PATENTS
3,247,392  4/1966  Thelen............... 350/164 X
3,423,147  1/1969  Thelen............... 350/166

FOREIGN PATENTS OR APPLICATIONS
1,028,899  3/1953  France............... 350/166

*Primary Examiner*—Gerhard R. Strecker
*Attorney, Agent, or Firm*—McGlew and Tuttle

[57] ABSTRACT

A wide-band multilayer interference filter comprises a filter having a periodic arrangement of layers of the structure ABCDDCBA, where A,B,C,D indicate individual layers having each an optical thickness of one-fourth of the predetermined constructional wavelength and the mutually different refraction indices of said layers fulfill the following conditions:

$$Y^2 - 2y(x^2 - x + 1/x) + 1 = 0$$

where $$x = n_A/n_B$$
$$y = n_B/n_C$$

and $$n_A n_D = n_B n_C.$$

8 Claims, 4 Drawing Figures

WIDE-BAND MULTILAYER INTERFERENCE FILTER

BACKGROUND OF THE INVENTION

1. Field of the Invention

The present invention relates in general to the construction of light filters to a multilayer interference filter having a wide transmission range, in which the stopbands of higher order are partly suppressed.

2. Description of the Prior Art

The theories of approximation advanced by Epstein and Thelen and concerning the construction of filters with suppressed stopbands or extended passbands are known; see, for example, A. Thelen, J. Opt. Soc. Am. 56, 1533 (1966).

Epstein has shown that under certain assumptions, nonabsorbing periodic multilayer systems comprise a stopband for those bands of wavelengths for which the following condition is valid:

$$|\cos \Sigma \phi|/t > 1 \qquad (1)$$

where $\phi = (2\pi/\lambda)nd$ is a measure for the thickness of each layer of the system (the so-called phase thickness), and $\Sigma\phi$ is the sum of the phase thicknesses of all layers within a period; $t$ is the transmission of each period, by period in the sense of this description being understood the partial pack of layers recurring in identical structure several times within the whole system.

As may be seen, the given condition (1) is fulfilled if $$\Sigma\phi = m\pi$$

where $m = 1, 2, 3$, etc., except for the case of $t = 1$.

The mentioned theory has been applied by Epstein and later on by Thelen to different filter constructions having an enlarged passband.

In laying down his formula (1), Epstein assumed that multiple reflections between the boundary surfaces of the individual layers of the multilayer system may be neglected. However, as it is well known, this is only approximately the case and that is why in some applications, filters constructed in accordance with the present state of the art could not offer a satisfactory solution.

In the optical technique, particularly such filters are of interest in which several mutually adjacent stopbands are suppressed and thereby a wide passband is obtained. Approximate solutions of this problem corresponding to the mentioned Epstein's theory have hitherto been developed only for filters in which at most three adjacent stopbands are suppressed. For filters with larger passbands, the known theory has not proved usable.

SUMMARY OF THE INVENTION

The present invention provides a wide-band multilayer interference filter in which the stopbands of higher order are partly suppressed and it is characterized by a superposition of layers having a periodic structure ABCDDCBA, where A, B, C, D are the individual layers having each an optical thickness of one-fourth of the predetermined constructional wavelength and in which the mutually different refractive indices of the indicated layers fulfill the following conditions:

$$y^2 - s^y(x^2 - x + 1/x) + 1 = 0$$

where $$x = n_A / n_B$$
$$y = n_B / n_C$$

and $$n_A n_D = n_B n_C.$$

The given equation admits two solutions, namely $$y_1 = x^2 - x + 1/x + x - 1/x (1 + x^2)^{1/2}$$
$$y_2 = x^2 - x + 1/x - x - 1/x (1 + x^2)^{1/2}$$

For the construction of a filter in accordance with the invention, the refraction indices $n_A$ and $n_B$ and therefore $$x = n_A/n_B$$

can be freely chosen.

Consequently, a $y$ ($y_1$ or $y_2$), i.e., the ratio $n_B$ over $n_C$ can be determined.

Thereupon, the values $n_C$ and $n_D$ can be determined as follows:

$$n_C = n_B/y$$
$$n_D = n_B n_C/n_A$$

As has been proved by a further examination, the filter in accordance with the invention is a structure in which five adjacent stopbands are suppressed.

Accordingly it is an object of the invention to provide a wide-band multilayer interference filter in which the stopbands of a higher order are partly suppressed.

For an understanding of the principles of the invention, reference is made to the following description of typical embodiments thereof as illustrated in the accompanying drawing.

GENERAL DESCRIPTION OF THE PREFERRED EMBODIMENTS

Figure 4:
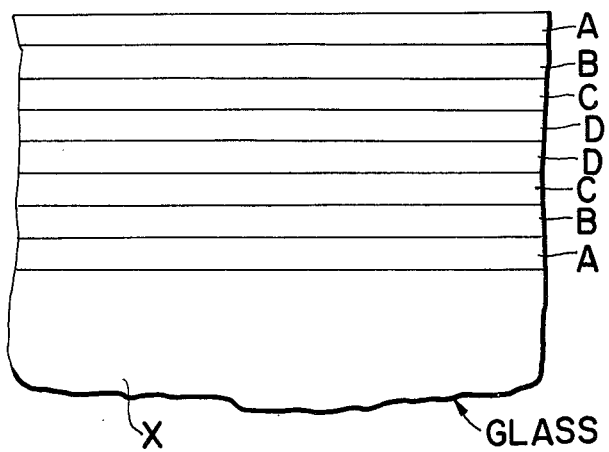
FIG. 4 is an enlarged sectional view of a filter constructed in accordance with the invention.

While giving the following description of some examples, the abbreviations common in the art are used to indicate the layer structures. Thus, the first numeral (when given) means the refractive index of the medium at one side of the layer system; for example, 1.50 is a glass having the refractive index 1.50. The letters A, B, C, D shown in FIG. 4 indicate different layers having the refractive indices $n_A$, $n_B$, $n_C$, $n_D$ arranged, for example, on a glass base $x$.

The thickness of these layers is to be determined. For the purpose of the present description, there are always meant layers having an optical thickness of $\lambda/4$, where $\lambda$ is the reference wavelength for which the filter is constructed. The optical thickness of the layer, as it is well known, is defined by the product of the refractive index and the geometric thickness. An expression within parentheses (for example ABCD ....) denotes a sequence of layers comprising the respective indicated layers, and a superior index, if used, indicates how many times the layer sequence put in parentheses recurrs. It is to be noted that in such a recurring sequence, layers of the same kind may apply against each other, for example, two layers A, and may in such case be considered as a single layer having the thickness 2A. The last number given in such a formula means the refractive index of the medium adjacent the other side of the layer system; thus, 1.0 means that the layer system borders on vacuum or, in practical cases, on air.

In the following, some examples of the inventive solutions are described in more detail.

Figure 1:
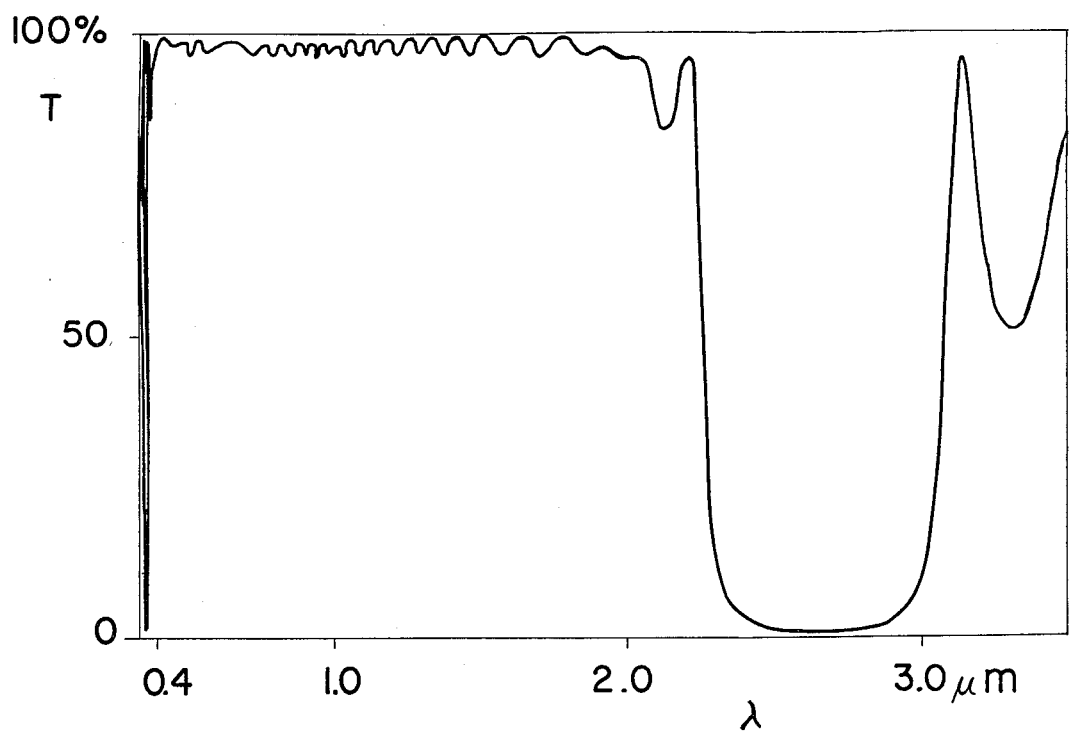
FIG. 1 shows a transmission characteristic curve of a first embodiment of the invention.

FIG. 1 shows the transmission characteristic of a first example which is a filter having a passband of approximately 0.4 to 2.3 $\mu$m followed by a stopband extending approximately to $3\mu$m. This layer system comprises the following periodic structure:

1.50 (A B C D D C B A )$^8$ 1.0 with the refractive indices
$n_A = 1.46$
$n_B = 1.68$
$n_C = 2.04$
$n_D = 2.35$ and is constructed for a wavelength of 650nm ($0.65\mu$m).

Figure 2:
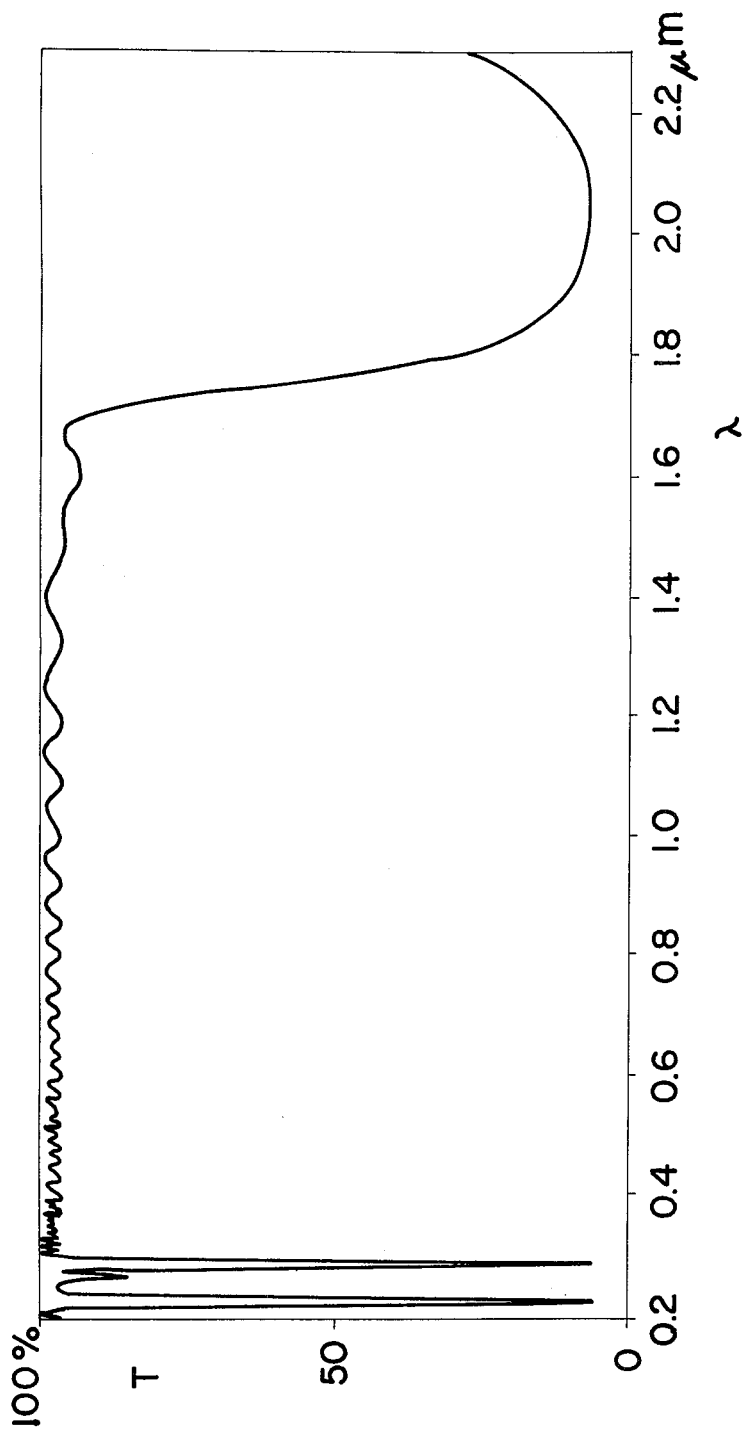
FIG. 2 is a curve similar to FIG. 1 of another embodiment of the invention.

Another example, represented by its characteristic in FIG. 2, is intended for the ultraviolet, visible, and nearinfrared spectral regions and has the structure 1.45 (A B C D D C B A )$^6$ 1.0 with the refractive indices
$n_A = 1.38$
$n_B = 1.55$
$n_C = 1.83$
$n_D = 2.08$ and a constructional wavelength of 500nm ($0.5\mu$m). As may be seen in FIG. 2, the passband of this filter extends from approximately 0.3 to almost 1.7 $\mu$m.

Figure 3:
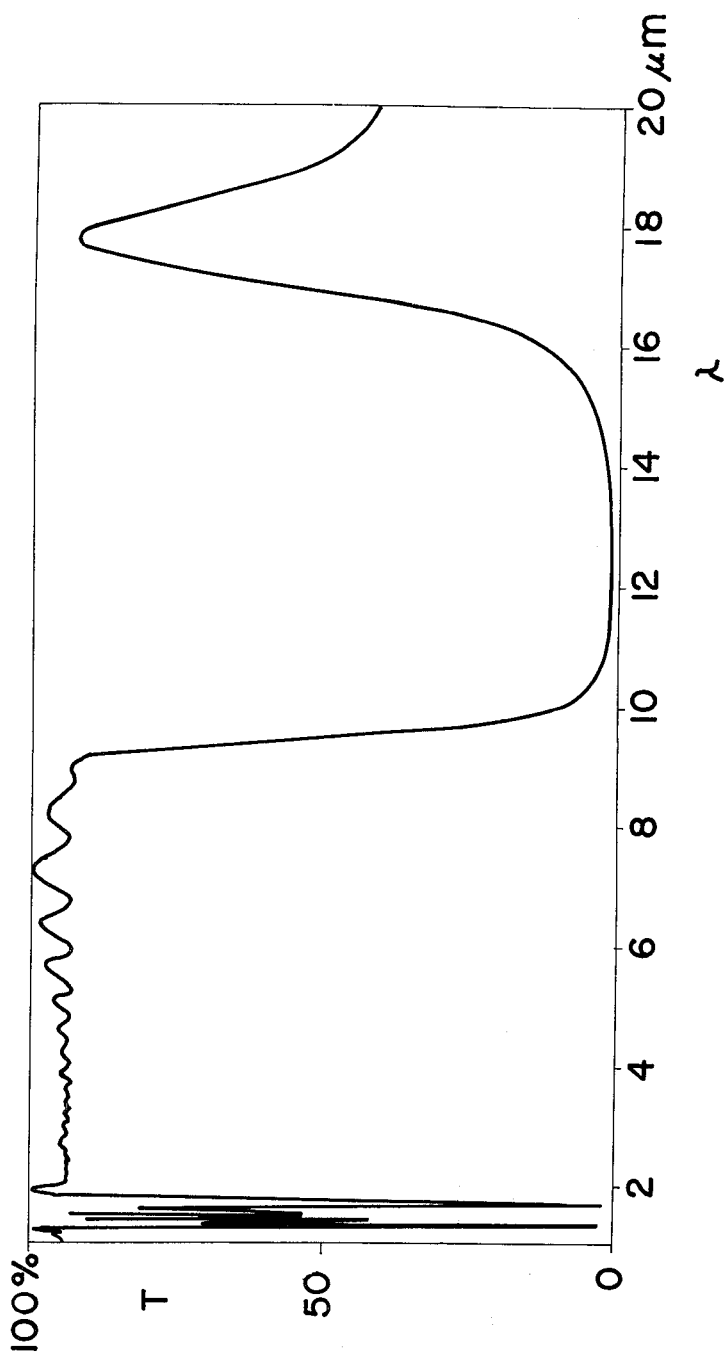
FIG. 3 is a curve similar to FIG. 1 of still another embodiment of the invention.

The third example, characterized in FIG. 3, is an infrared transmission filter having a passband extending from 2 to 9 $\mu$m followed by a large stopband extending up to 1.6 $\mu$m. This filter has the structure 1.45 ( A B C D D C B A )$^4$ 1.0 with the respective indices
$n_A = 1.80$
$n_B = 2.31$
$n_C = 3.28$
$n_D = 4.20$ and is provided for a constructional wavelength of 3 $\mu$m.

In general, it is recommendable to repeat the periodical structure within the layer system at least three times.

As layer materials may be used the known optical layer substances having a sufficient transmission in the desired spectral region; primarily, the layers are made of substances which can easily be deposited by evaporation or cathode sputtering, i.e., silicon dioxide (quartz), aluminum oxide ($Al_2O_3$), zirconium oxide ($ZrO_2$), and titanium dioxide ($TiO_2$). For the visible spectral region and the adjacent infrared (examples 1 and 2), $MgF_2$, $ThF_4$, $La_2O_3$ may be used.

For filters whose transmission has to extend farther into the infrared, the layers used may be of silicon monoxide (SiO), zinc sulfide (ZnS), silicon (Si) and germanium (Ge). The methods of deposition of the layers, preferably by evaporation and cathode sputtering, are known and their description seems superfluous.

In order to make the principle of the invention more understandable, the theory laid down by the inventor is explained as follows:

First it is necessary to accept (after Epstein) the term: equivalent refractive index N of a symmetrical combination of nonabsorbing layers. As it is known, this equivalent refractive index is given by the formula $$N = (M_{21}/M_{12})^{1/2} \quad (2)$$

where $M_{21}$ and $M_{12}$ are the elements of the matrix of the layer combination; to this, see: Principles of Optics, by Max Born and Emil Wolf, New York 1964, pp. 51 ff.

For a layer system consisting only of layers having the same optical thickness, the respective matrix is given by the following polynomials: for an odd $\nu$ $$M_{12} = j(a_1 \sin\phi \cdot \cos^{\nu-1}\phi + a_3 \sin^3\phi \cdot \cos^{\nu-3}\phi + ... + a_\nu \sin^\nu\phi)$$

$$M_{21} = j(b_1 \sin\phi \cdot \cos^{\nu-1}\phi + b_3 \sin^3\phi \cdot \cos^{\nu-3}\phi + ... + b_\nu \sin^\nu\phi)$$

and for an even $\nu$ $$M_{12} = j(a_1 \sin\phi \cdot \cos^{\nu-1}\phi + a_3 \sin^3 100 \cdot \cos^{\nu-3}\phi + ... + a_{\nu-1} \sin^{\nu-1}\phi \cos\phi)$$

$$M_{21} = j(b_1 \sin\phi \cdot \cos^{\nu-1}\phi + b_3 \sin^3\phi \cdot \cos^{\nu-3}\phi + ... + b_{\nu-1} \sin^{\nu-1}\phi \cos\phi)$$

where $\nu$ is the number of layers of the combination having mutually equal optical thicknesses, and $a$ and $b$ are functions of the refractive index; $j = \sqrt{-1}$.

By introducing these terms into the above equation (2) and eliminating the sine functions, the following expressions are obtained for the equivalent refraction index N:

for an odd $\nu$ $$N = (A_1 \cos^{\nu-1}\phi + A_3 \cos^{\nu-3}\phi + ... + A_\nu / B_1 \cos^{\nu-1}\phi + B_3 \cos^{\nu-3}\phi + ... + B_\nu)^{1/2}$$

for an even $\nu$ $$N = (A_1 \cos^{\nu-2}\phi + A_3 \cos^{\nu-4}\phi + ... + A_{\nu-1} / B_1 \cos^{\nu-2}\phi + B_3 \cos^{\nu-4}\phi + ... + B_{\nu-1})^{1/2}$$

The reduction $C = (A_1/B_1)^{1/2}$ gives
for an odd $\nu$ $$N = C(\cos^2\phi - \alpha_1)(\cos^2\phi - \alpha_2)...(\cos^2\phi - \alpha_{1/2(\nu-1)})/(\cos^2\phi - \beta_1)(\cos^2\phi - \beta_2)...(\cos^2\phi - \beta_{1/2(\nu-1)}))^{1/2} \quad (3)$$

and for an even $\nu$ $$N = C((\cos^2\phi - \alpha_1)(\cos^2\phi - \alpha_2)...(\cos^2\phi - \alpha_{1/2(\nu-2)})/(\cos^2\phi - \beta_1)(\cos^2\phi - \beta_2)...(\cos^2\phi - \beta_{1/2(\nu-2)}))^{1/2} \quad (4)$$

It is a finding of the present invention that the points for which the expressions within parentheses ($\cos^2\phi - \alpha_p$) or ($\cos^2\phi - \beta_q$) become zero, i.e., where $\cos^2\phi - \alpha_p$ or $\cos^2\phi = \beta_q$, are the edges of the stopbands of the filter and that the stopbands can be eliminated when one manages to choose the refractive indices of the layers so that in the given formula, one or more of the expressions within parentheses of the form $$(\cos^2\phi - \alpha_p)$$

can be cancelled relative to the corresponding expressions $$(\cos^2\phi - \beta_q)$$

A success in this respect including more of such expressions in parentheses in succession means that the same number of adjacent stepbands disappears. Thus, in principle, the possibility is given to provide filters in which several adjacent stopbands are suppressed. Unfortunately, for the present, the theory is not so developed as to permit a deduction how the refractive indices must be chosen in each case to eliminate any stopband desired. However, the effective characteristics of the proposed solution may thereby be made more understandable. In considering the inventive arrangement of the layers, calculating the equivalent refractive index N according to the foregoing explanation, and making the corresponding $\alpha_p$ and $\beta_q$ equal to $\cos^2\phi$, the advanced theory is found confirmed.

What is claimed is:

1. A wide-band multilayer interference filter in which the stopbands of higher order are partly suppressed, comprising a filter having a periodic arrangement of layers of the structure ABCDDCBA, where A,B,C,D indicate individual layers having each an optical thickness of one-fourth of the predetermined constructional wavelength and the mutually different refraction indices of said layers fulfill the following conditions:

$$y^2 - 2y(x^2 - x + 1/x) + 1 = 0$$

where $$x = n_A/n_B$$
$$y = n_B/n_C$$

and $$n_A\, n_D = n_B\, n_C$$

2. A wide-band multilayer interference filter according to claim 1, wherein the structural sequence ABCDDCBA in the layer system recurrs at least three times.

3. A wide-band multilayer interference filter according to claim 1, wherein the refractive indices of the layers are:
$n_A = 1.46$
$n_B = 1.68$
$n_C = 2.04$
$n_D = 2.35$ 4. A wide-band multilayer interference filter according to claim 1, wherein the refractive indices of the layers are:
$n_A = 1.38$
$n_B = 1.55$
$n_C = 1.83$
$n_D = 2.05$ 5. A wide-band multilayer interference filter according to claim 1, wherein the refractive indices of the layers are:
$n_A = 1.80$
$n_B = 2.31$
$n_C = 3.28$
$n_D = 4.20$.

6. A wide-band multilayer interference filter according to claim 1, wherein
the layers A are made of $SiO_2$,
the layers B are made of $Al_2O_3$,
the layers C are made of $ZrO_2$,
the layers D are made of $TiO_2$.

7. A wide-band multilayer interference filter according to claim 1, wherein
the layers A are made of $MgF_2$,
the layers B are made of $ThF_4$,
the layers C are made of $La_2O_3$,
the layers D are made of $ZrO_2$.

8. A wide-band multilayer interference filter according to claim 1, wherein
the layers A are made of $SiO_2$,
the layers B are made of ZnS,
the layers C are made of Si, and
the layers D are made of Ge.

* * * * *